United States Patent
Chawla et al.

(10) Patent No.: US 8,250,529 B2
(45) Date of Patent: *Aug. 21, 2012

(54) SPECIFICATION TO ABAP CODE CONVERTER

(75) Inventors: Sachinder S. Chawla, San Francisco, CA (US); Jason Chen, Fremont, CA (US); Alex Gorelik, Fremont, CA (US); Hon C. Thio, Castro Valley, CA (US); Dave Wang, San Jose, CA (US)

(73) Assignee: SAP America, Inc., Newtown Square, PA (US)

( * ) Notice: Subject to any disclaimer, the term of this patent is extended or adjusted under 35 U.S.C. 154(b) by 1363 days.

This patent is subject to a terminal disclaimer.

(21) Appl. No.: 11/835,396

(22) Filed: Aug. 7, 2007

(65) Prior Publication Data

US 2007/0271548 A1 Nov. 22, 2007

Related U.S. Application Data

(63) Continuation of application No. 10/854,287, filed on May 25, 2004, now Pat. No. 7,320,122, which is a continuation of application No. 09/260,121, filed on Mar. 2, 1999, now Pat. No. 6,772,409.

(51) Int. Cl.
*G06F 9/44* (2006.01)
(52) U.S. Cl. ................ 717/117; 717/104; 717/112
(58) Field of Classification Search .............. None
See application file for complete search history.

(56) References Cited

U.S. PATENT DOCUMENTS

| 4,506,326 | A | 3/1985 | Shaw et al. |
| 5,448,740 | A | 9/1995 | Kiri et al. |
| 5,530,848 | A | 6/1996 | Gilbert et al. |
| 5,758,032 | A | 5/1998 | Sanders |
| 5,815,713 | A | 9/1998 | Sanders |
| 5,842,212 | A | 11/1998 | Ballurio et al. |
| 6,148,335 | A | 11/2000 | Haggard et al. |
| 6,192,370 | B1 | 2/2001 | Primsch |
| 7,320,122 | B2 * | 1/2008 | Chawla et al. ............ 717/109 |

FOREIGN PATENT DOCUMENTS

| EP | 0511437 A1 | 11/1992 |
| EP | 0602263 A1 | 6/1994 |
| EP | 0737918 A2 | 10/1996 |

OTHER PUBLICATIONS

SAP R/3 Data Warehouse and Application Integration, pp. 1-17.
Enterprise Data Warehousing for SAP R/3 ©, 1998, pp. 1-17.
Curran, "Technical Review: SAP's ABAP/4 Development Workbench," *Object Manager*, Dec. 1994, pp. 10-15.
Date, "An Introduction to Database Systems," vol. I, 5th Edition, *Addison-Wesley Publishing Company*, 1990, pp. 455-488.

* cited by examiner

*Primary Examiner* — Chuck Kendall
(74) *Attorney, Agent, or Firm* — Mintz, Levin, Cohn, Ferris, Glovsky and Popeo, P.C.

(57) ABSTRACT

A method of generating procedural language code for extracting data from a data warehouse comprising the steps of accepting a declarative specification and generating procedural language code to execute the declarative specification.

20 Claims, 6 Drawing Sheets

CREATE VIEW MyJoin (VBELN char(10)KEY, POSNR varchar(6) KEY, AUART char(4), VKGRP char(3), VKBUR char(4), GUEBG date, GUEEN date, BNAME char(35), MATNR char(18), MATWA char(18), KMPMG decimal(13,3), WAVWR decimal(13,2), NETPR decimal(11,2))

AS SELECT VBAK.VBELN, VBAP.POSNR, VBAK.AUART, VBAK.VKGRP, VBAK.VKBUR, VBAK.GUEBG, VBAK.GUEEN, VBAK.BNAME, VBAP.MATNR, VBAP.MATWA, VBAP.KMPMG, VBAP.WAVWR, VBAP.NETPR
    FROM VBAK,VBAP
        WHERE VBAK.VBELN = VBAP.VBELN;

FIG. 5

CREATE VIEW MyJoin (VBELN char(10) KEY, POSNR varchar(6) KEY, AUART char(4), VKGRP char(3), VKBUR char(4), GUEBG date, GUEEN date, BNAME char(35), MATNR char(18), MATWA char(18), KMPMG decimal(13,3), WAVWR decimal(13,2), NETPR decimal(11,2))

AS SELECT VBAK.VBELN, VBAP.POSNR, VBAK.AUART, VBAK.VKGRP, VBAK.VKBUR, VBAK.GUEBG, VBAK.GUEEN, VBAK.BNAME, VBAP.MATNR, VBAP.MATWA, VBAP.KMPMG, VBAP.WAVWR, VBAP.NETPR
    FROM VBAK,VBAP
        WHERE VBAK.VBELN = VBAP.VBELN AND VBAP.POSNR = 'XYZ123';

FIG. 6

| | | | | |
|---|---|---|---|---|
| | | Description | Type | Table Description |
| Table → | VBAK(sap30d.) | Sales Document Header Data | | |
| | MANDT | Client | char(3) | |
| Key Column → | VBELN | Sales Document | char(10) | |
| | ERDAT | Date on which the record was created | date | |
| | ERZET | Entry time | time | Column Description |
| | ERNAM | Name of the user who created the obj... | char(12) | |
| | ANGDT | Quotation/Inquiry is valid from | date | |
| | BNDDT | Date until which bid/quotation is bindin... | date | |
| | AUDAT | Document date (incoming or outgoing... | date | |
| | VBTYP | SD document category | char(1) | |
| | TRVOG | Transaction group | char(1) | Column Type and Size |
| | AUART | Sales document type | char(4) | |
| | AUGRU | Order reason (reason for the business... | char(3) | |
| | GWLDT | Beginning of the warranty period | date | |
| | SUBMI | Collective number of RFQs | char(10) | |
| | LIFSK | Delivery block (document header) | char(2) | |
| | FAKSK | Billing block in SD document | char(2) | |
| | NETWR | Net value of the order in document cur... | decimal(15,2) | |
| | WAERK | Document currency | char(5) | |
| | VKORG | Sales organization | char(4) | |

General Attributes | Class Attributes

| Attribute | Value |
|---|---|
| Date_created | Thur Jan 28 15:33:29 1999 |
| Date_last_loaded | NotSupported |
| Elapsed_Time_For_Load | |
| Number of Rows → Estimated_Row_Count | 50000 |
| Number_Of_Deletes | |
| Number_Of_Inserts | |
| Number_Of_Rows_Rejected | |
| Number_Of_Updates | |
| Total_Number_Of_Rows_Processed | |

VBAK(sap 30d.)

Ready

SPECIFICATION TO ABAP CODE CONVERTER

BACKGROUND OF THE INVENTION

The present invention relates to database processing in general and to generation of ABAP code in particular.

SAP R/3 system is an Enterprise Resource Management system used to manage various IT subsystems used to operate a company (e.g., manufacturing, sales and distribution, logistics) in an integrated fashion. A typical SAP R/3 installation requires extensive configuration to embed the specific business rules for the company using SAP R/3 into the system as well as produce the reports required by the company. Most of a generic SAP R/3 system as well as most of the configuration and reporting is written using the ABAP/4 language.

One approach to extracting data uses ETL ("Extraction, Transformation and Loading") tools to convert a procedural specification into a procedural language to execute that specification. However, since the specification is a procedural specification, the user has to manually specify the optimal (most efficient and fastest) way of executing the specification.

SUMMARY OF THE INVENTION

According to one embodiment of the present invention, procedural language code is generated for extracting data from an operational system such as an SAP R/3 system, for transforming it and for loading it into a target system, such as a data warehouse. This is done by accepting a declarative specification and generating procedural language code to execute the declarative specification.

The data extraction process for extracting data from an SAP R/3 system accepts a declarative specification, in visual form or otherwise, and uses an optimizer to optimize the specification and generate an execution plan to perform the extractions and transformations specified in the declarative specification. The process then generates a procedural program in the ABAP language to perform the operation. This approach allows the user to focus on what needs to be done, while the system takes care of the most efficient way for how to do it. Figuring out the most efficient way for executing the specification is a complicated process and will take much effort if done manually by the user. This approach is particularly beneficial when the specification is revised, because the system can easily reoptimize the entire specification and produce a new optimal plan.

A further understanding of the nature and advantages of the inventions herein may be realized by reference to the remaining portions of the specification and the attached drawings.

BRIEF DESCRIPTION OF THE DRAWINGS

FIG. 5 is an illustration of a set of declarative language statements.

FIG. 6 is a second illustration of a set of declarative language statements.

FIG. 7 is an illustration of metadata imported for a table from an SAP R/3 system.

This application includes two appendices listing ABAP program code.

DESCRIPTION OF THE SPECIFIC EMBODIMENTS

Figure 1:
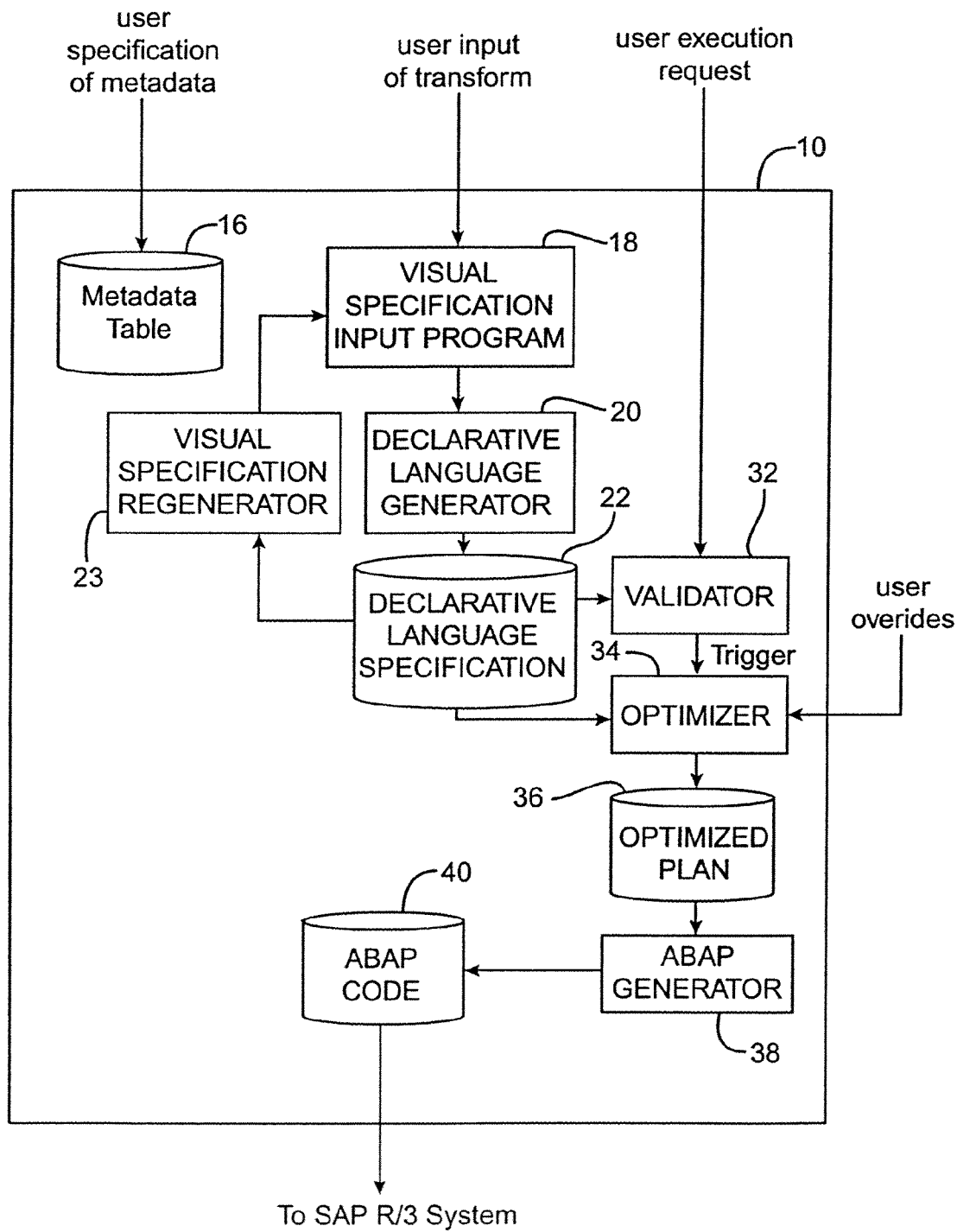
FIG. 1 is a block diagram of a converter according to one embodiment of the present invention for generating an ABAP program from a specification.

There are three steps to optimized ABAP generation as performed by a converter 10 of specifications to ABAP code used to extract data from a SAP R/3 system. Such a converter 10 is shown generally in FIG. 1. The first step is importing metadata about the SAP data that the ABAP code will access. This metadata includes an indication of what SAP tables are available for reading and the columns, keys, sizes and primary-foreign key relationships for those tables. A sample of such metadata is shown in FIG. 7. The metadata is extracted from the SAP data dictionary and stored in a metadata repository 16.

The second step is specifying the transformations to be made by the converter. In a preferred embodiment, a user visually specifies the transformations. For example, a user might use an input device to input the transformations, including the sources, targets for the transformations by way of a visual specification input program 18 (see FIG. 3). A declarative language generator 20 then generates a declarative language specification from the visual representation and stores the specification in a repository 22. If the user wants to change the specification, the declarative language specification is read from repository 22, converted to a visual representation by a regenerator 23, and displayed to the user using visual specification input program 18. Any changes made to the visual specification are converted back into the declarative language specification and stored back in the repository 22. Each declarative language specification stored in repository 22 is named by the user with a job name The third step is executing the transformation specification from repository 22 upon user request. This is done by various elements shown in FIG. 1. Once triggered by a user, a validator 32 reads a specification having the job name requested by the user from repository 22 and validator 32 validates the specification against the imported metadata stored in metadata table 16. Validator 32 ensures that, for example, the tables and columns used in the specification exist, column types match the metadata or, if they do not match, can be converted automatically. For example, an integer can be converted to a string, but a date might not be convertible to a floating-point number automatically. Other validations include ensuring that all columns and tables exist and that the correct number and type of parameters are passed to functions.

Figure 4:
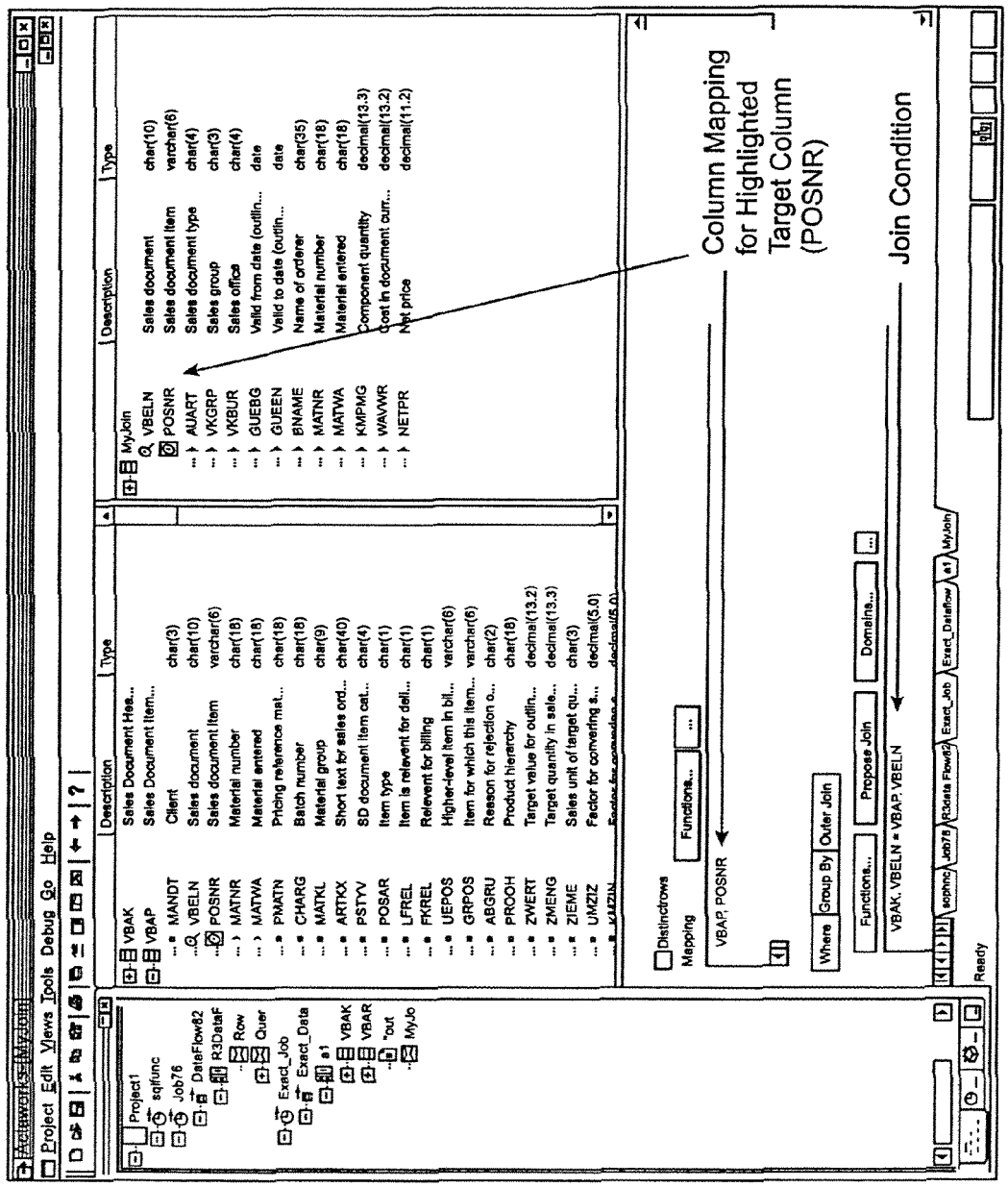
FIG. 4 is a screen shot of a display of a computer system used to graphically input specifications.

Once validator 32 validates the specification, validator 32 passes the specification, or a reference thereto, to an optimizer 34. If validator 32 does not validate the specification, it does not pass the specification on and issues an error message. Optimizer 34 determines the optimum way to perform the tasks specified in the specification. An example of this is shown in FIGS. 4-5. The output of optimizer 34 is an optimized "plan" 36. The optimizer uses all available information such as sizes of tables, key information, index information and primary-foreign key relationships to determine the best way to perform the tasks. The best way is generally the least computationally intensive (i.e., using the least amount of computer resources), but may also be defined as the fastest regardless of how many resources it uses. In some cases, the users may choose to override the optimizer by specifying the plan themselves.

Optimizer 34 provides the optimized plan 36 to an ABAP code generator 38, which generates the ABAP language code 40 usable to execute the plan. The specification tells the converter 10 what to extract, transform and load while the plan is an optimized execution plan generated by the optimizer that tells converter 10 how to extract, transform and load the data. Samples of such code can be found in the appendices to this application.

Figure 2:
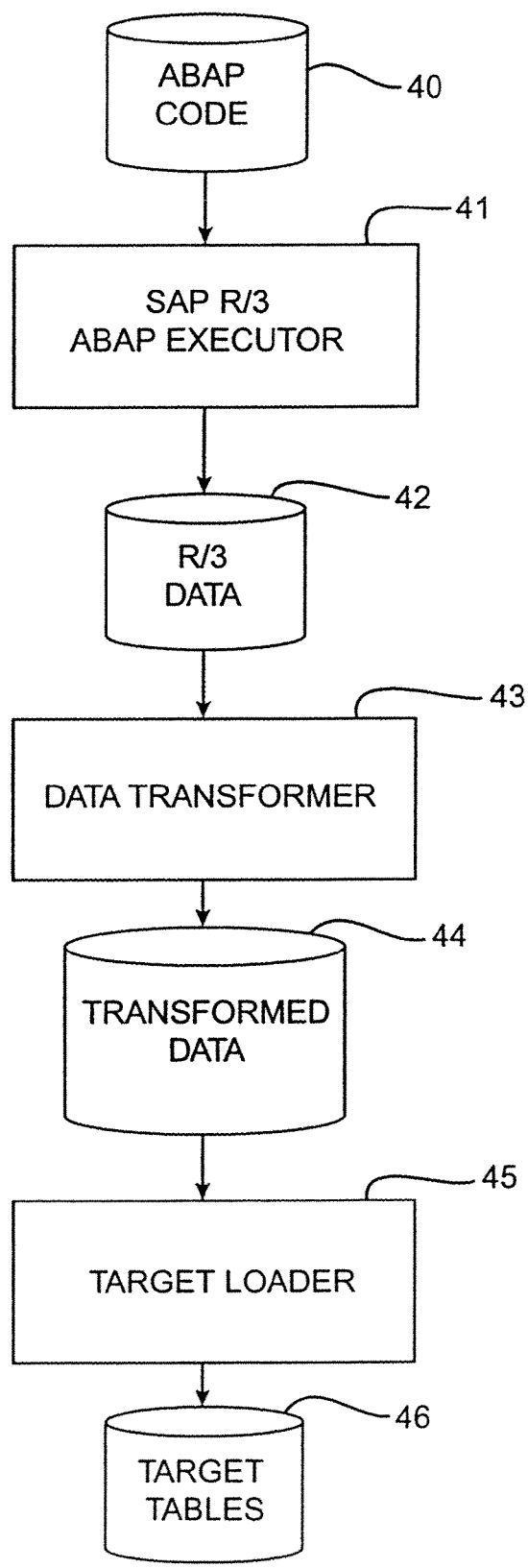
FIG. 2 is a block diagram of a process for executing an ABAP program according to one embodiment of the present invention.

ABAP code 40 is then executed by the SAP R/3 system and the data retrieved from SAP, as illustrated in FIG. 2. As shown there, a SAP R/3 ABAP executor 41 executes ABAP code 40, resulting in R/3 data 42 and a data transformer 43 transforms R/3 data 42 into transformed data 44 according to the user specification. For example, if the SAP-specific part extracts a list of employees from SAP, additional transformations performed outside of the SAP R/3 system may look up salary paid to date from a payroll system in an Oracle™ database as well as a 401K balance stored in a PeopleSoft™ employee tracking system] A target loader 45 then uses this transformed data 44 to populate target tables 46. A target table 46 is typically (but not necessarily) in a data warehouse. It is populated with the data extracted from the operational systems and transformed according to the user specifications as described above.

Figure 3:
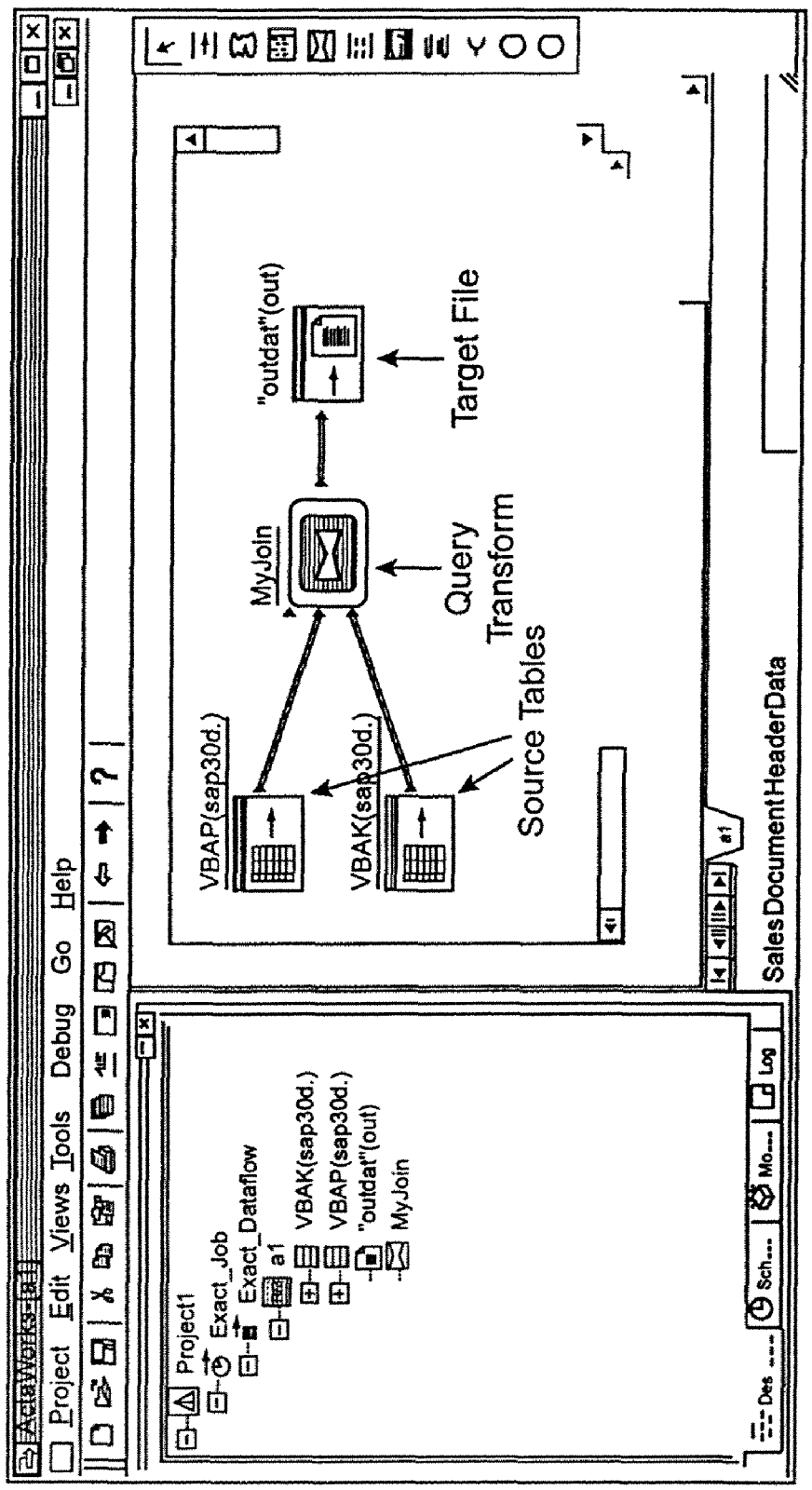
FIG. 3 is a screen shot of a display of a computer system used to generate a visual representation of a specification.

FIG. 3 illustrates the table inputs and outputs as well as the query transform; The Source tables are inputs into the Query Transform called MyJoin. The results of the query are loaded into the target file.

FIG. 4 is a screen shot of a display of the specification of the join in MyJoin Query Transform shown in FIG. 3. As shown therein, the join condition is specified in the Where tab, while the mappings for the columns are displayed in the Mapping window. The diagram shows the mapping for the highlighted column (POSNR)—which is set to the value of the POSNR column of the input table VBAP.

An example of the declarative language resulting from the visual specification shown in FIG. 4 is shown in FIG. 5. The declarative language statements are a dialect of SQL called ATL, which is short for "Acta Transformation Language", a language developed by the assignee of the present application. Although the statements are shown in ATL, they could be represented in any declarative language.

In the example described above, optimizer 34 would determine that VBAK (the order header) is much smaller than VBAP (the line item), as each order typically has multiple line items. Therefore, optimizer 34 would set up a loop join with VBAK as the outer table and VBAP as the inner table. A query server-executing a loop join selects a row from VBAK (an order header), then gets all rows from VBAP that match the Sales Document number (VBELN) for that order (all the line items).

Appendix A is a listing of the generated ABAP program, with the code corresponding to the join shown in bold.

Another example of generated ABAP code is shown in FIG. 6. There, an additional condition exists on the line item. Optimizer 34 would notice that since it has a predicate on the primary key for the VBAP table, it would only get a single row from that table. Therefore, it would be a less work computationally to select a single order line item from VBAP (the one with POSNR='XYZ123') and then look up the order header record for it from VBAK, then to go through ALL the order headers (VBAK) and for each to go through all the line items (VBAP) until we find the one with POSNR='XYZ123'. Therefore, the optimizer would then make VBAP the outer table and generate the ABAP code shown in Appendix B.

In a specific example, converter 10 processes a declarative specification to generate a procedural language program and executes the procedural language program. The declarative specification specifies what to do, but not necessarily how to do it. For example, a specification might specify joining an employee table with address tables based on employee ID. In SQL, a statement to this effect might be:

SELECT EMPLOYEE.NAME, ADDRESS.STREET_ADDRESS FROM EMPLOYEE, ADDRESS WHERE EMPLOYEE.EMPLOYEE_ID=ADDRESS.EMPLOYEE_ID

It is up to converter 10 to figure out the best way to execute that specification and join the two tables. One way to join the tables is to take a row from the employee table, extract the employee ID, read the address table and, for every row, check for a match of the row's employee ID and the employee ID extracted from the employee table and return the two rows in the case of a match.

One way to execute the specification is to generate ABAP code and execute that ABAP code. ABAP is a procedural language used by the SAP R/3 system. Converter 10, in addition to generating ABAP code, applies query optimization techniques to the specification in generating the ABAP code optimally.

Converter 10 can generate ABAP code for both scalar functions and vector functions. ABAP programmers can create functions in the ABAP language, but such functions do not return any value and have input and output parameters. Using the code generating capabilities of converter 10, however, a declarative specification could include calls to scalar functions. An example of a scalar function usage is:

SELECT FOO(T.A)::Y FROM T WHERE FOO(T.B)::Z>10 where the function FOO has one input parameter (X) and two output parameters (Y and Z). The above function comprises two calls. In the first call, column A is passed as input parameter X and the value of output parameter Y is returned by the function. In the second call, column B is passed as the input parameter X and the value of output parameter Z is returned by the function and compared to 10. In addition, functions can be used to return multiple values. For example, the select statement SELECT FOO(T.A) FROM T would return the values of the two output parameters (Y and Z) and is equivalent to SELECT FOO(T.A)::Y, FOO(T.A)::Z FROM T. Converter 10 handles generating all of the ABAP code necessary to effectuate such a scalar function, allowing a specification to specify more complex functions.

As for vector functions, converter 10 generates ABAP language for vector functions, in which input and/or output parameters can be tables. Converter 10 processes vector functions, if they are present in a declarative specification, by generating the appropriate procedural (ABAP) program to execute that specification. The ABAP code generated by converter 10 handles a wide range of other operations. For example, ABAP code to read and load R/3 tables and files is supported. Another supported operation is table lookup, which is an operation that returns a value from a table given values for a set of keys. For example, given an employee ID, a table lookup operation may return the employee's department number from the department table.

Converter 10 also handles parameterized declarative extraction specifications and generates therefrom parameterized ABAP programs for extracting data from SAP R/3 such that parameters can be passed at run-time to affecting the operation of the ABAP program. In some cases, the data being joined as a result of a specification is includes some R/3 data and some non-R/3 data, including relational databases and files. The data can be joined from a single declarative specification. The result of the conversion of such a specification is set of ABAP programs, SQL queries and in-memory transformation modules to extract, transform and load the data from the multiple sources.

In some embodiments, converter 10 can carry through user-written ABAP code to be combined with the generated ABAP code. A user can write custom ABAP code and specify the output schema for the custom code. In this way, the custom code can be executed as part of the extraction specification and to the data generated by this custom ABAP code can be used in subsequent transformations.

Normally, declarative specifications do not allow for a specified number of iterations, but converter 10 accepts iterator participation in a declarative specification. An iterator can be implemented as an ordered set of integers. The set size is specified by the user. This set can be combined with other operations to simulate a set number of iterations. For example, an iterator set of 12 can be joined with an employee table to return a set of the 12 highest paid employees. Another example is that an iteration set of 100 can be used to call a function 100 times—one for each row in the set. In this way, an iterator set can be used to simulate iterations for declarative languages, such as SQL, that do not have iteration operations.

Converter 10 also generates ABAP code to integrate IDOCs (Intermediate DOCuments) with relational tables. IDOCs are hierarchical multi-set structures in which each level is called a segment. Each segment contains rows of columns as well as other segments (called subsegments). For example, a segment can have columns A and B and segments C and D where A is an integer, B is a string (10) field and C is a segment with columns X, Y and subsegment Z, where X is an integer, Y is an integer and Z is a segment, etc. Each row of such a segment would have a value for column A, a value for column B and two subsegments C and D, where subsegment C would have a set of rows where each row has a value for column X, a value for column Y and a subsegment Z, and so on. An example of an IDOC description report generated by SAP R/3 is included in Appendix C. The IDOC format for intermediate documents is a SAP specific format, typically used for electronic data interchange ("EDI") and Application Linking and Embedding ("ALE") used for communication between different SAP systems.

An IDOC is characterized by an IDOC type, which indicates the SAP format is used to interpret the data of a business transaction. An IDOC type comprises a control record, which is identical for each IDOC type, data records and status records. One data record comprises a fixed key part and a variable data part, where the data part is interpreted using segments, which differ depending on the IDOC type selected and specify the format with which the data records of IDOCs are interpreted.

In a typical approach, a tool extracts data from an IDOC by placing the DOC data into a file and having a procedural specification for how to read and transform the file, such as the files used by the Mercator™ system sold by TSI corporation. Converter 10 generates ABAP code to extract data from the IDOCs without needing to first place the data in files.

If necessary, converter 10 can treat individual segments and subsegments as relational tables and allow them to participate in relational queries or can generate the necessary ABAP code to perform the same function.

As described above, data can be extracted a SAP R/3 Enterprise Resource Planning system based on a visual and declarative specification of source objects, transformations and target objects. The system described above generates a program of optimized ABAP code to extract, transform and load those objects according to the specification. Source objects include Tables, Hierarchies, Files and IDOCs (intermediate documents). Transformations include standard SQL operations, lookups, joins, function calls, iterators, and custom ABAP blocks. Targets include files or tables.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of generating procedural language code for extracting data from an operational system, the method comprising:
   accepting a declarative specification; and
   generating procedural language code from the declarative specification to execute a data extraction, transformation and loading process defined by the declarative specification.

2. The method of claim 1, wherein the procedural language code is ABAP language code and the operational system is an SAP R/3 system.

3. The method of claim 2, further comprising optimizing the declarative specification prior to generating the ABAP program code.

4. The method of claim 1, wherein the declarative specification is a visual specification.

5. The method of claim 1, wherein the declarative specification includes at least one of a scalar function, a vector function, parameterized declarative extraction specifications, custom ABAP code or a lookup operation.

6. The method of claim 1, wherein the generating includes generating ABAP code to read and load R/3 tables, files and IDOC intermediate documents.

7. The method of claim 1, wherein generating comprises:
   reading a single declarative specification for extraction of SAP R/3 and non-SAP R/3 data including relational databases and files; and
   executing the specification as a set of ABAP programs, SQL queries and in-memory transformation modules to extract, transform and load data from multiple sources.

8. The method of claim 1, wherein the generating procedural language code forms part of generating ABAP code with parameter expressions to be evaluated at run time.

9. The method of claim 1, further comprising:
   integrating an IDOC intermediate document with relational tables; and
   generating ABAP code to extract data from integrated intermediate documents and relational tables.

10. The method of claim 9, further comprising processing individual tables as relational tables.

11. The method of claim 10, wherein the processing forms part of generating ABAP code.

12. A non-transitory computer readable medium including executable instructions to generate procedural language code for extracting data from an operational system, comprising executable instructions to:
   accept a declarative specification; and
   generate procedural language code from the declarative specification to execute a data extraction, transformation and loading process defined by the declarative specification.

13. The computer readable medium of claim 12, wherein the procedural language code is ABAP language code and the operational system is an SAP R/3 system.

14. The computer readable medium of claim 13 including executable instructions to: optimize the declarative specification prior to generating the ABAP program code.

15. The computer readable medium of claim 12, wherein the declarative specification is a visual specification.

16. The computer readable medium of claim 12, wherein the declarative specification includes at least one of a scalar function, a vector function, parameterized declarative extraction specifications, custom ABAP code or a lookup operation.

17. The computer readable medium of claim 12, wherein the generating includes generating ABAP code to read and load R/3 tables, files and IDOC intermediate documents.

18. The computer readable medium of claim 12, wherein the generating comprises:
   reading a single declarative specification for extraction of SAP R/3 and non-SAP R/3 data including relational databases and files; and
   executing the specification as a set of ABAP programs, SQL queries and in-memory transformation modules to extract, transform and load data from multiple sources.

19. The computer readable medium of claim 12, wherein the generating procedural language code forms part of generating ABAP code with parameter expressions to be evaluated at run time.

20. The computer readable medium of claim 12 including executable instructions to:
   integrate an IDOC intermediate document with relational tables; and
   generate ABAP code to extract data from integrated intermediate documents and relational tables.

* * * * *